United States Patent [19]

Takayama et al.

[11] Patent Number: 4,499,487
[45] Date of Patent: Feb. 12, 1985

[54] CAMERA OPERABLE WITH FLASH AND IN DAYLIGHT AND TUNGSTEN MODES

[75] Inventors: Makoto Takayama, Kanagawa; Tomotaka Muramoto, Tokyo; Akimasa Nishimura, Kanagawa, all of Japan

[73] Assignee: Canon Kabushiki Kaisha, Japan

[21] Appl. No.: 467,348

[22] Filed: Feb. 17, 1983

[30] Foreign Application Priority Data

Feb. 26, 1982 [JP] Japan .................................. 57-31228

[51] Int. Cl.³ .............................................. H04N 9/04
[52] U.S. Cl. ........................................ 358/41; 358/29; 354/126; 354/149.1
[58] Field of Search .................... 358/41, 29; 354/126, 354/149.1

[56] References Cited

U.S. PATENT DOCUMENTS 4,003,062 1/1977 Galbraith, Jr. ....................... 354/126
4,047,194 9/1977 Nakamura et al. .............. 354/149.1

Primary Examiner—Richard Murray
Attorney, Agent, or Firm—Toren, McGeady and Stanger

[57] ABSTRACT

In the disclosed camera a switch-over arrangement changes its photographic mode between a tungsten-light mode and a day-light mode, and, when a flash unit is used, a setting arrangement sets the camera in the day-light mode in response to completion of the preparation for flash emission of the flash unit.

6 Claims, 6 Drawing Figures

CAMERA OPERABLE WITH FLASH AND IN DAYLIGHT AND TUNGSTEN MODES

BACKGROUND OF THE INVENTION

1. Field of the Invention

This invention relates to a camera and more particularly to a camera whose operation is changeable between a tungsten-light mode and a day-light mode.

2. Description of the Prior Art

Generally, the operation of video cameras (motion and still pictures) and TV cameras, for example, is switchable between a tungsten-light mode and a daylight mode as desired. In a generally practiced method for effecting this switch-over, the color balance of the camera is either optically or electrically shifted according to the difference in color characteristics between tungsten-light and day-light. For example, white balance is set on the basis of tungsten-light and, for changing to the daylight mode, either the color mixing ratio of R (red) and B (blue) is changed in processing the electrical signals or a CCA filter (a color conversion type A filter) is inserted in front of the image pickup surface.

For flash photography with a camera set up in such a manner, the photographic mode of the camera must be set in the daylight mode according to the color characteristic of the light to be emitted by the flash device in use. In this connection, it is conceivable either to set the camera in the daylight mode manually when mounting a flash unit on the camera or to set the day-light mode substantially in response to mounting of a flash unit on the camera. In the former case, however, there is always the fear that the photographer will forget to perform the manual operation. In the latter case, a tungsten illuminated photograph becomes impossible without flash while the flash unit is mounted on the camera. Further, where monitoring is desired, monitoring in the tungsten-light mode is preferable if the object to be photographed continues to be under tungsten illumination until immediately before a flash photograph. Therefore, the mode switch-over arrangements of the prior art described have been apt to be inconvenient.

Such cameras have the following disadvantages:

Where the photographic mode must be manually controlled, the operation becomes complicated; the manual operation tends to be forgotten; or there is a tendency to plerform erroneously. Where the photographic mode is arranged to be automatically set to a mode suited for flash photography by mounting a flash unit on the camera, an appropriate photograph becomes impossible without using the flash unit if the flash unit is left mounted on the camera; and this arrangement causes inconvenience in carrying out monitoring prior to photography, because such monitoring is preferably carried out in the original mode before flash photography even if the original mode differs from the mode suited for flash photography.

SUMMARY OF THE INVENTION

It is an object of the invention to provide a novel camera which is of the type whose operating mode is changeable between a tungsten-light mode and a day-light mode and yet obviates the various disadvantages of prior art cameras of this type.

It is another object of the invention to provide a novel camera in which, at the time of flash photography, the photographic mode of the camera is automatically set to a mode suited for aflash photography by completion of preparations for a flash by the flash unit.

To attain these objects, a preferred embodiment of the invention is provided with change-over means for changing the photographic mode between a tungsten-light mode and a day-light mode and means for setting the photographic mode to the day-light in response to completion of preparation of flash emission by a flash device when the flash device is to be used. The term "completion of preparation of flash emission of a flash device" as used herein means, for example, that charging of a flash energy accumulating main capacitor has been completed and the flash device has become ready to flash in response to a flash triggering action.

A camera arranged in this manner eliminates the aforementioned disadvantages of the prior art.

These and further objects and features of the invention will become apparent from the following detailed description of embodiments thereof taken in connection with the accompanying drawings.

DETAILED DESCRIPTION OF THE PREFERRED EMBODIMENTS

Figure 1:
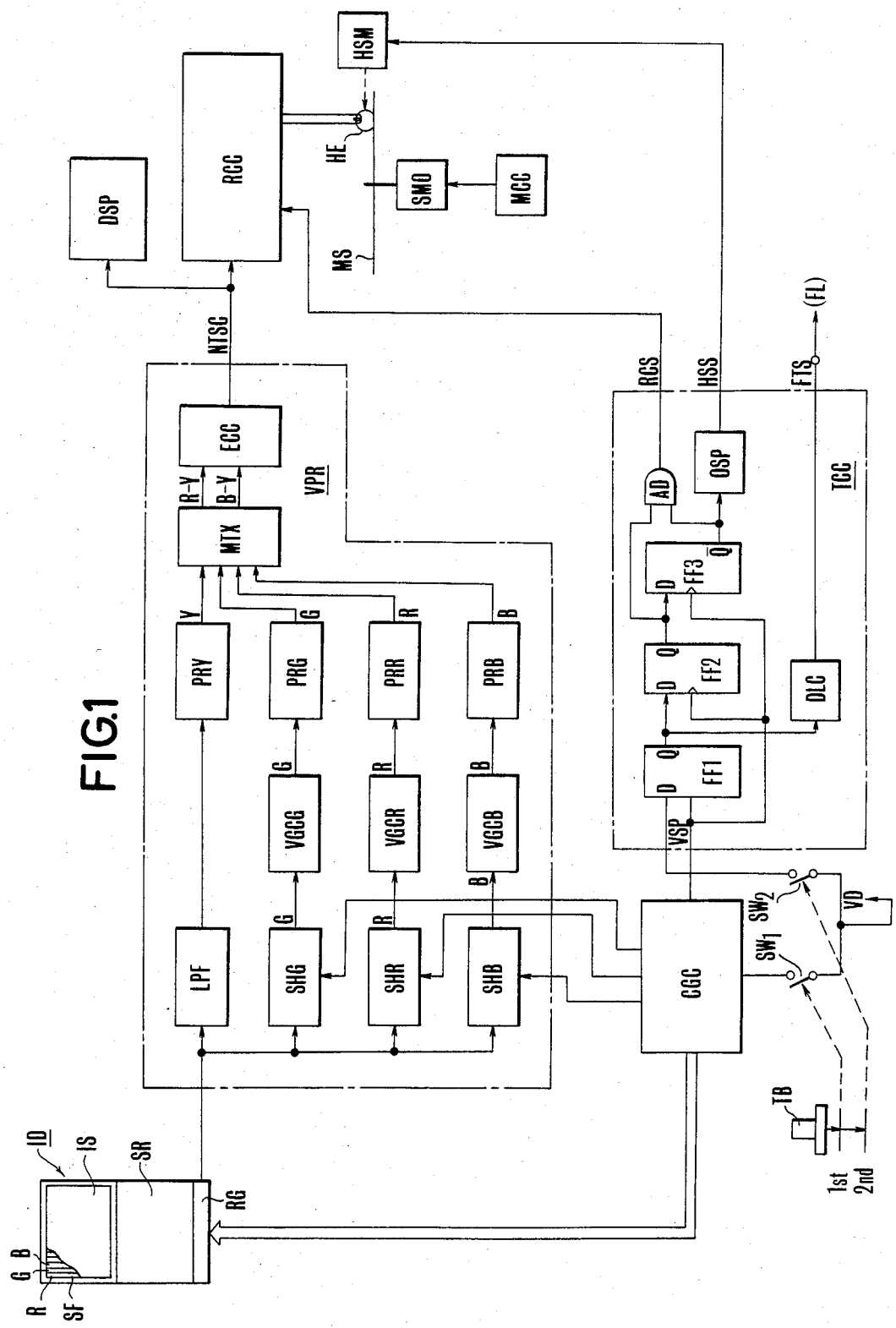
FIG. 1 is a circuit block diagram showing the electrical circuit arrangement of a still video camera to which the present invention is applicable.

FIG. 1 shows a still video camera as an example of cameras to which the present invention is applicable. The video camera includes an image pickup element ID which in this specific example is a known frame transfer type CCD composed of an image pickup part IS, a storage part SR and an output register RG. In front of the image pickup part IS, there is provided a color stripe filter SF which has red (R), green (G) and blue (B) filter parts repeatedly arranged in a predetermined manner. The image pickup element ID is arranged to be driven by drive clock pulses coming from a clock pulse generation circuit CGC. An image signal produced from the image pickup element ID is processed by a known image signal processing circuit VPR. The image signal processing circuit VPR comprises a low-pass filter LPF for obtaining information on the brightness of an object to be photographed; a Y signal processing circuit PRY which produces a brightness signal (hereinafter will be called Y signal) by processing a signal which is produced from the low-pass filter and corresponds to the brightness of the object; color separating sample and hold circuits SHG, SHR and SHB which sample and hold a signal corresponding to green included in the output of the image pickup element ID (hereinafter this signal will be called G signal), a signal corresponding to red included in the output (hereinafter will be called R signal) and a signal corresponding to blue included in the output (hereinafter will be called B signal) respectively in response to sampling pulses from the clock pulse generation circuit CGC; variable gain amplifier circuits VGCG, VGCR and VGCB which amplify the output signals of the sample and hold circuits SHG, SHR and SHB in accordance with control voltages supplied to these amplifier circuits; color signal processing circuits PRG, PRR and PRB which process the output signals of these amplifier circuits VGCG, VGCR and VGCB and produce G, R and B signals from their output terminals respectively; a matrix circuit MTX which produces, for example color difference signals R-Y and B-Y on the basis of the Y, G, R and B signals produced from the processing circuits PRY, PRG, PRR and PRB; an encoder circuit ECC which converts the output of the matrix circuit MTX, for example, into an NTSC signal; and a display device DSP which displays a picture according to the output signal of the encoder circuit ECC.

The output of the image signal processing circuit VPR is converted into a recording signal by a recording circuit RCC. The recording signal thus obtained is applied to a recording magnetic head HE. The magnetic head records the recording signal on a magnetic sheet MS which is used as recording medium. The sheet MS is rotated by a motor SMO. The rotation of the motor SMO is controlled, for example, to 3,600 rpm by a motor control circuit MCC. A head moving mechanism HSM is arranged to move the head HE to a predetermined extent in the radial direction of the sheet MS in response to a head moving control signal produced from a timing control circuit TCC which will be described later herein.

The camera is provided with a trigger button TB which is arranged to be operated in two steps. A switch SW1 is arranged to turn on in response to the first step operation of the trigger button TB and another switch SW2 to turn on in response to the second step operation thereof. Both the switches SW1 and SW2 receive a voltage VD from a voltage source. The switch SW1 is connected to the clock pulse generation circuit CGC to actuate the circuit CGC when it turns on. The switch SW2 is connected to the timing control circuit TCC to actuate the circuit TCC when it turns on.

The timing control circuit TCC controls the flashing action of a flash device which will be described later herein, the signal recording action by the recording circuit RCC and the movement of the head HE by the head moving mechanism HSM, on the basis of synchronizing pulses VSP corresponding to the vertical synchronizing signal produced from the clock pulse generation circuit CGC. The control circuit TCC comprises D flip-flops FF1, FF2 and FF3 which are respectively of the fall edge synchronizing type. The trigger terminal of each of the flip-flops are arranged to receive synchronizing pulses VSP (FIG. 2(a)) of 1/60 sec. period corresponding to the vertical synchronizing signal from the clock pulse generation circuit CGC. The input terminal D of the flip-flop FF1 is connected to the switch SW2, that of the flip-flop FF2 to the output terminal Q of the flip-flop FF1 and that of the flip-flop FF3 to the output terminal Q of the flip-flop FF2 respectively. The output Q of the flip-flop FF1 (FIG. 2(c)) is arranged to be delayed a very short predetermined length of time $\Delta t << 1/60$ sec.) by means of a delay circuit DLC. The output (FIG. 2(d)) of the delay circuit DLC is used as a flash trigger signal FTS for a flash device FL. The output Q of the flip-flop FF2 (FIG. 2(e)) and the output $\overline{Q}$ of the flip-flop FF3 (FIG. 2(f)) are received by an AND gate AD. The output of the AND gate AD (FIG. 2(g)) is supplied to the recording circuit RCC as a recording control signal RCS. A one shot circuit (a monostable multivibrator) OSP is arranged to produce a single pulse signal in response to the fall of the output $\overline{Q}$ of the flip-flop FF3. This output of the circuit OSP (FIG. 2(h)) is supplied to the head moving mechanism HSM as a head movement control signal HSS.

With the camera arranged in this manner, a first step operation on the trigger button TB causes the switch SW1 to turn on. The clock pulse generation circuit CGC is actuated by the switch SW1. The image pickup element ID then begins to be driven. The image signal produced from the image pickup element ID is then divided into Y, G, R and B signals at the image signal processing circuit VPR in a conventionally known manner. These signals are then further processed through a predetermined manner and are produced as an NTSC signal. This NTSC signal is supplied to the recording circuit RCC and also to the display device DSP. The display device DSP then displays a picture. When the switch SW1 turns on, it also actuates the motor control circuit MCC. This causes the motor SMO to rotate at a predetermined rotational speed.

Figure 2:
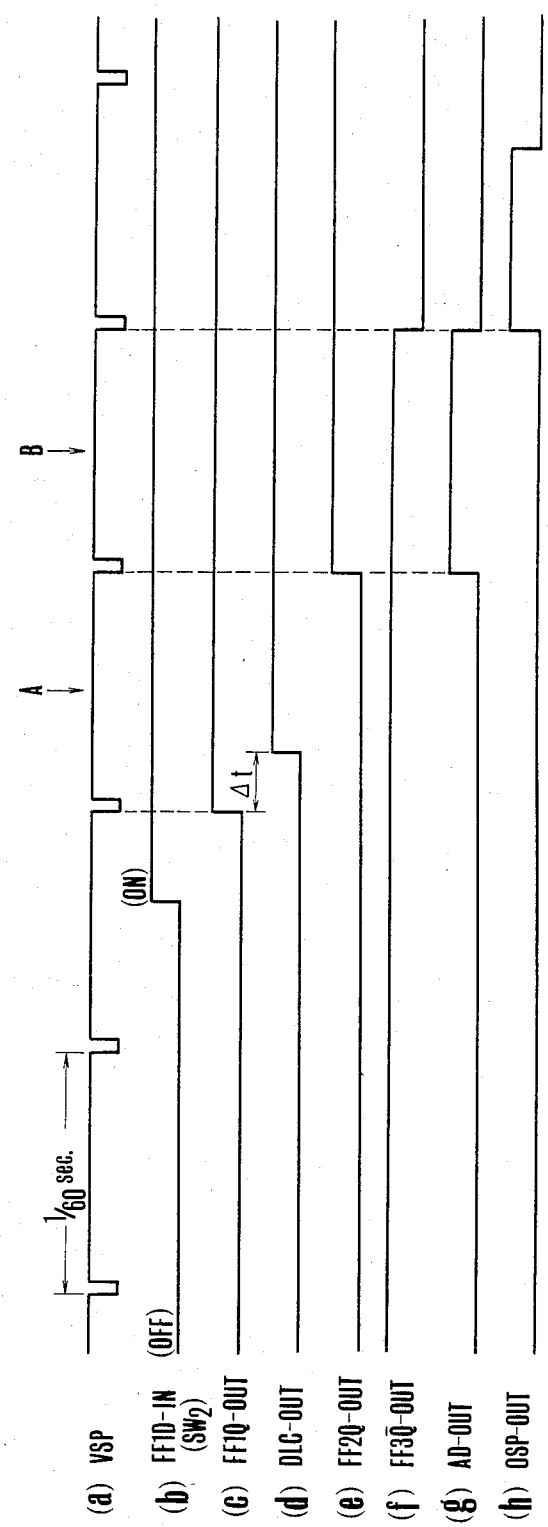
FIG. 2 is a timing chart showing the input and output timing of each circuit block included in a timing control circuit shown in FIG. 1.

After that, when the switch SW2 is caused to turn on by the second step operation of the trigger button TB as indicated in FIG. 2(b), the level of the output Q of the flip-flop FF1 in the timing control circuit TCC becomes high (FIG. 2(c)) in synchronism with the fall of the synchronizing pulse VSP (FIG. 2(a)) which takes place immediately after the turning on of the switch SW2. Then, delaying a very short period of time $\Delta t$ therefrom, the output level of the delay circuit DLC becomes high (FIG. 2(d)). This causes the flash device FL to flash. In other words, the flashing action of the flash device FL is performed during a period A indicated in FIG. 2(a). Then, at the timing of the next synchronizing pulse VSP, the image information accumulated during the period A at the image pickup part IS of the image pickup element ID is transferred to the storage part SR. The information is then read out through the output register RG during a next period B. However, in the control circuit TCC then, the level of the output Q of the flip-flop FF2 becomes high in synchronism with the fall of the above stated next synchronizing pulse VSP as shown in FIG. 2(e). Meanwhile, since the level of the output $\overline{Q}$ of the flip-flop FF3 is high at that time (FIG. 2(f)), the output level of the AND gate AD becomes high as shown in FIG. 2(g). In the recording circuit RCC then, for example, the output terminal of a last stage recording amplifier which is not shown released from a grounded state, and a recording signal is applied to the head HE. The recording signal is then recorded through the head HE in a concentric track on the sheet MS which is rotated by the motor SMO. After the lapse of 1/60 sec. from the start of recording, the level of the output Q of the flip-flop FF3 becomes low (FIG. 2(f)) in synchronism with the fall of a next synchronizing pulse VSP. Then, the output level of the AND gate AD becomes low as shown in FIG. 2(g). At this point of time, therefore, the supply of the recording signal from the recording circuit RCC to the head HE discontinues. As a result of this, the recording action comes to a stop at a point of time when a picture signal for one field is completely recorded in one concentric track of the sheet MS. Further, in response to the change of the level of the output $\bar{Q}$ of the flip-flop from a high level to a low level, that is, in response to the termination of the recording action, the one shot circuit OSP produces a single pulse as indicated in FIG. 2(h). This pulse output of the circuit OSP causes the head moving mechanism HSM to move the head HE in the radial direction to an extent corresponding to one track pitch.

As described in the foregoing, a picture signal for one field is recorded in one track of the sheet MS every time the trigger button TB is operated once.

Further, in processing an image signal at the image signal processing circuit VPR, white balance adjustment is generally accomplished by controlling the gain controlling voltages for the variable gain amplifier circuits VGCR and VGCB for the R and B signals on the basis of, for example, the output signals R-Y and B-Y of the matrix circuit MTX (automatic white balance).

Figure 3:
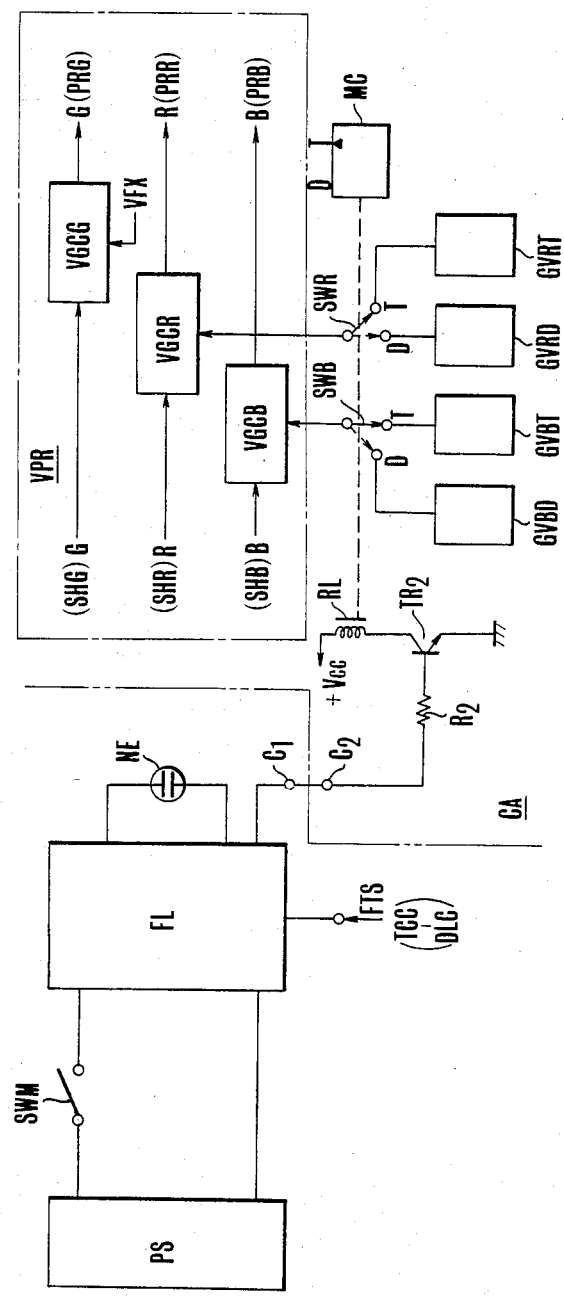
FIG. 3 is a circuit block diagram showing an embodiment of the invention and particularly the electrical arrangement of the essential parts of improvement introduced by the invention.

An embodiment of the invention in which the invention is applied to a still video camera which is arranged as described above is as shown in FIG. 3. Referring to FIG. 3, a flash device FL is connected with a power supply circuit PS via a manually operable power supply switch SWM. With the switch SWM turned on, a power supply is effected to the flash device FL from the power supply circuit PS and then the flash device begins to be charged. A neon lamp NE is arranged to indicate completion of charging of a flash energy accumulating main capacitor of the flash device FL. Between the flash device and the camera, there are arranged connection terminals C1 and C2 to introduce to the camera CA a signal the level of which becomes high upon completion of charging of the main capacitor and which is thus introduced as a signal representative of completion of preparation of flash light emission of the flash device FL.

The camera CA includes an npn switching transistor TR2 which is arranged to be turned on by the high level signal coming from the connection terminals C1 and C2. A resistor R2 is arranged to restrict the base current of the switching transistor TR2. A relay RL is connected to the collector of the transistor TR2. A control voltage supply circuit GVRT is arranged to supply a gain controlling voltage required for setting the gain of the variable gain amplifier circuit VGCR of the image signal processing circuit VPR to be in a mixing ratio suited for the tungsten-light mode in respect to the R signal. A control voltage supply circuit GVRD is also arranged to supply a gain controlling voltage required for setting the gain of the variable gain amplifier circuit VGCR for the R signal to be in a blending ratio suited for the day-light mode in respect to the R signal. A control voltage supply circuit GVVT is arranged to supply a gain controlling voltage required for setting the gain of the variable gain amplifier circuit VGCB for the B signal to be in a blending ratio suited for the tungsten-light mode in respect to the B signal. Another control voltage supply circuit GVBD is arranged to supply a gain controlling voltage required for setting the gain of the variable gain amplifier circuit VGCB for the B signal to be in a blending ratio suited for the day-light mode in respect to the B signal. A switch SWR is arranged to effect switching between the voltage supply circuits GVRT and GVRD for the amplifier circuit VGCR. Another switch SWB is arranged to effect switching between the voltage supply circuits GVBT and GVBD for the amplifier circuit VGCB. The camera is provided with operation means MC for simultaneous manual switching of the switches SWR and SWB. In this particular embodiment, the above stated relay RL is arranged such that, when it is energized, it has priority over the switching operation of the operation means MC and serves to switch both the switches SWR and SWB to their day-light mode terminals D, that is, to fix their positions to the sides of the voltage supply circuits GVRD and GVBD. As for the variable gain amplifier circuit VGCG for the G signal, a predetermined voltage VFX is arranged to be applied thereto to fix the gain at a predetermined value.

With the embodiment arranged in this manner, if the photographing mode of the camera CA is set in the tungsten-light mode "T" by the operation means MC, both the switches SWR and SWB are on their tungsten-light mode terminals T. In this condition, the voltage supply circuits GVRT and GVBT are selected for the amplifier circuits VGCR and VGCB respectively. The gains of the amplifier circuits VGCR and VGCB are adjusted by the control voltages from these voltage supply circuits GVRT and GVBT to have a color balance (white balance) suited for tungsten-light illumination. When the power supply switch SWM of the flash device FL is closed to perform a flash photographing operation under this condition, the neon lamp NE comes to light up upon completion of charging of the main capacitor provided for accumulation of a flashing energy. Then, the transistor TR2 turns on to energize the relay RL, which then causes the switches SWR and SWB to be forcedly connected to the terminals D irrespectively of the operation of the operation means MC. The voltage supply circuits GVRD and GVBD are thus selected respectively for the amplifier circuits VGCR and VGCB. The gains of the amplifier circuits VGCR and VGCB are adjusted by the control voltages from these voltage supply circuits GVRD and GVBD to obtain a color balance (white balance) suited for day-light illumination. The camera CA is fixed to this condition.

When the neon lamp NE is turned off due to the flashing action of the flash device FL in response to the trigger signal FFS (FIG. 2(d)) from the delay circuit DLC in the timing control circuit TCC in FIG. 1, the transistor TR2 turns off to cut off the power supply to the relay RL. Accordingly, the switches SWR and SWB are brought back to a state of being under the control of the operation means MC. In other words, in this case, the position of these switches SWR and SWB are brought back to the terminals T because the operation means MC is in the position of the tungsten-light mode "T".

Figure 4:
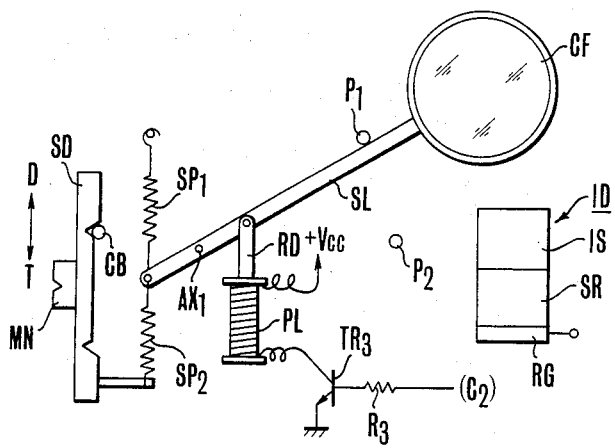
FIG. 4 is a schematic illustration showing the mechanical arrangement of the essential parts of another embodiment which differs from the arrangement of the embodiment shown in FIG. 3.

In the embodiment described above, changing between the tungsten light mode and the day-light mode is effected by changing the mixing ratio of R, G and B. This method, however, may be replaced with another method in which: An image pickup system which has been color balanced for tungsten-light illumination is arranged to be adjustable to day-light illumination by inserting a CCA filter into a photo-taking optical path in such a way as to effect changeover between the two modes. An example of this method is as shown in FIG. 4 as another embodiment of the invention. Referring now to FIG. 4, the embodiment includes a CCA filter CF which is carried by one end of a swingable lever SL which is swingable about a shaft AX1, so that the CCA filter CF can be inserted in front of the image pickup part IS of an image pickup element ID. There are provided restricting pins P1 and P2 for defining the inserted and retracted positions of the filter CF. A spring SP1 is arranged between the tail end of the lever SL and a fixed pin P3 to urge the filter CF to move to the inserted position thereof. Another spring SP2 is arranged between the tail end of the lever SL and a slide member SD which is arranged to permit the filter CF to be manually inserted and retracted. The slide member SD is provided with an operation knob MN and a click member CB which is arranged to stop the slide member SD in a clicked manner at its positions corresponding to the inserted and retracted positions of the filter CF. The embodiment is further provided with an npn switching transistor TR3 which is arranged to be turned on by a charge completion signal supplied from the above stated connection terminals C1 and C2. R3 is a resistor for protection of the transistor TR3; PL is a plunger which is connected to the collector of the transistor TR3; and RD is a rod of the plunger PL. The rod RD is linked to a part of the swingable lever.

Assuming that the photographing mode of the embodiment arranged as described above is set at the tungsten-light mode by the operation knob MN, the slide member SD is in a lower position. Therefore, the swingable lever SL is turned by the force of the spring SP2 counterclockwise about the shaft AX1 against the force of the other spring SP1 until its turning movement is restricted by the pin P1. Accordingly, the filter CF is then at the retracted position relative to the image pickup part IS of the image pickup element ID as shown in FIG. 4. With the embodiment operated for flash photography under this condition, the transistor TR3 turns on upon completion of charging of the main capacitor of the flash device FL. With the transistor TR3 thus turned on, a power supply is effected to the plunger PL. The rod RD is then retracted to cause the lever SL to turn clockwise about the shaft AX1 against the force of the spring SP2 until the clockwise turning movement is restricted by the pin P2 irrespectively of the set position of the operation knob MN. Then, the filter CF is inserted in front of the image pickup part IS of the image pickup element ID. The photographing mode is thus forcedly set in the daylight mode. Further, the neon lamp NE is turned off by the flashing action of the flash device FL in the same manner as in the case of the preceding embodiment. After that, the transistor TR3 turns off to cut off the power supply to the plunger PL. The filter CF is therefore brought back to a state of being under the control of the operation knob MN. In other words, since the operation knob MN is at the position corresponding to the tungsten-light mode "T" in this instance, the filter CF is brought back to the retracted position as shown in FIG. 4.

Figure 5:
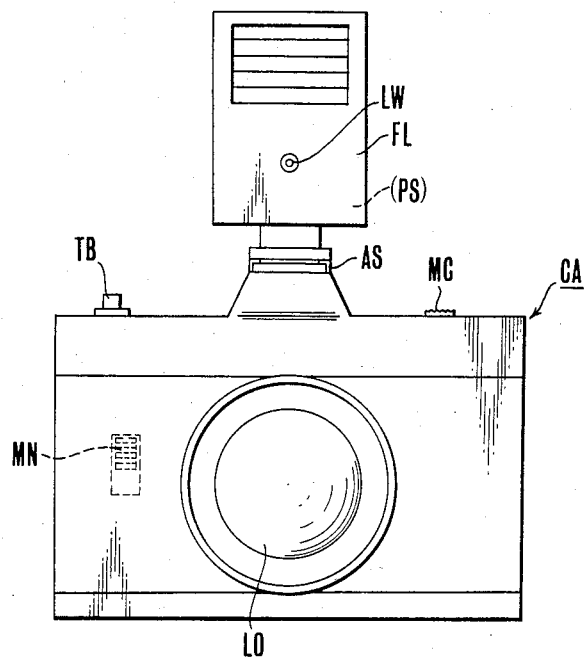
FIG. 5 is a schematic illustration showing an example of a camera which embodies the invention and is arranged to have a flash device mounted thereon.

FIG. 5 shows an example of the arrangement of the camera embodying the present invention. In this case, the camera is not of the type incorporating a flash device. As shown, the camera CA is provided with an accessory shoe AS for mounting a flash device FL thereon. The terminal C2 which is mentioned in the foregoing is provided at this shoe AS. The image pickup element ID which is shown in FIGS. 1 and 4 is disposed at a predetermined focal plane of a photo-taking lens LD. The trigger button TB shown in FIG. 1 is disposed at a suitable position on the upper left side of the top wall of the camera CA. In the case of the embodiment shown in FIG. 3, the operation means MC is disposed at a suitable position preferably on the upper right hand side of the top wall of the camera CA. Meanwhile, where the mode of embodiment shown in FIG. 4 is applied to the camera, the operation knob MN is disposed at a suitable position, for example, preferably on the left hand side of the front wall of the camera CA. Further, in case where an automatic flash light emission amount controllable electronic flash device is employed as the flash device FL, the flash device FL is provided with a reflection light receiving window LW behind which a light sensitive element is disposed for the purpose of measuring a reflection light.

Figure 6:
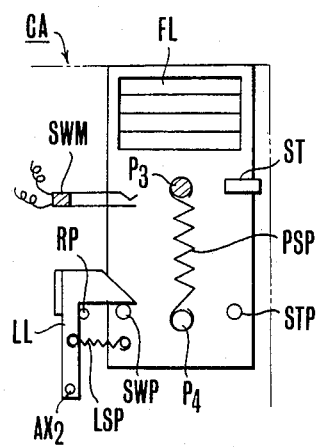
FIG. 6 is a schematic illustration showing the essential parts of a camera which embodies the invention and is arranged to have a flash device incorporated therein.

FIG. 6 shows another example the arrangement of a camera CA according to the invention in which a flash device is incorporated in the camera. Referring to FIG. 6, the flash device FL is pushed into the camera CA against the force of a pop-up spring PSP arranged between a pin P3 disposed within the camera CA and a pin P4 disposed on the side of the flash device FL. The flash device FL is kept in this position with a latch lever LL caused by a latch spring LSP to engage a switch pin SWP of the flash device FL. The latch lever LL is arranged to turn about a shaft AX2. The turning extent of the lever LL is restricted by a pin RP. When the flash device FL pops up, a stopper ST restricts the popping up extent of the flash device FL by engaging a stop pin STP of the flash device FL. The power supply switch SWM which is shown in FIG. 3 and provided for the flash device as mentioned in the foregoing is arranged, for example, to be closed by the switch pin SWP of the flash device FL when the flash device FL comes to the popped up position thereof.

With the camera CA arranged in this manner, when the switch pin SWP is unlatched by turning the latch lever LL counterclockwise about the shaft AX2 against the force of the spring LSP by operating an operation member which is not shown, the spring PSP causes the flash device FL to pop up until the stop pin STP comes to abut upon the stopper ST. Then, in this position, the switch pin SWP comes to close the switch SWM.

The popped up flash device FL can be brought back to its original position within the camera CA as shown in FIG. 6 by just pushing the upper part of the flash device FL downward until the switch pin SWP is latched by the latch lever LL. With the flash device FL brought back to this position, the switch SWM turns off by itself.

As has been described in detail, in the camera of the type arranged to permit a change-over of the photographing mode of a camera between a tungsten-light mode and a day-light mode, the invention permits mode selection as desired until a flash device becomes ready for flashing in the case of flash photography. In accordance with the invention, since the photographing mode is arranged to be automatically shifted and fixed to the day-light mode upon completion of preparation for flashing, the disadvantages of the prior art arrangement to manually effect the mode change-over or to automatically effect the mode change-over in response to a flash device mounting action, such as the fear of forgetting to make a manual operation or the inconvenience that photographing under tungsten-light illumination becomes impossible with a flash device left mounted on a camera can be eliminated. It is another advantage of the invention that monitoring can be accomplished continuously in the original mode until immediately before a flash photographing operation.

What we claim:

1. A camera for use with a flash device having means for generating an indication indicative of completion of preparation for flash emission, said camera comprising:
    (A) means for selecting a photographic mode of the camera from a first mode suited for photography under day-light illumination and a second mode suited for photography under tungsten-light illumination; and
    (B) means responsive to completion of preparation for the flash emission for fixing the photographic mode of the camera at said first mode irrespective of the selection by said selecting means.

2. The camera according to claim 1, further comprising:
    image pick-up means for providing an electrical signal indicative of image scanning;
    processing means for processing said electrical signal to produce a color image signal; and
    control means for controlling color balance of said color image signal produced by said processing means, said control means having a first control mode suited for said first photographic mode and second control mode suited for said second photographic mode;
    said selecting means being coupled to said control means to select the control mode from one of said first and second control modes in accordance with the selection of the photographic mode from said first and second photographic modes; and
    said fixing means being coupled to said control means to fix the control mode thereof at said first control mode in response to the completion of the preparation for the flash light emission of said flash device.

3. The camera according to claim 2, wherein said control means includes color balance control circuit means for controlling gain of the color signal processing by the processing means, said circuit means having said first and second control modes.

4. The camera according to claim 3, wherein said processing means includes variable gain means;
    said circuit means being arranged to control the gain of said variable gain means.

5. The camera according to claim 2, wherein said control means includes optical means for converting color-temperature characteristics of an image light to be received by said image pick-up means, said optical means having first and second states corresponding respectively to said first and second control modes.

6. The camera according to claim 5, wherein said optical means has a color conversion filter movable between first and second respective positions corresponding to said first and second states, at the first position the filter being inserted in a light path of said image light and at the second position the filter being retracted from said light path.

* * * * *